United States Patent
Quitzk (10) Patent No.: US 11,836,492 B2
(45) Date of Patent: Dec. 5, 2023

(54) EXTENDED POINTER REGISTER FOR CONFIGURING EXECUTION OF A STORE AND PACK INSTRUCTION AND A LOAD AND UNPACK INSTRUCTION

(71) Applicant: NXP B.V., Eindhoven (NL)

(72) Inventor: Stefan Quitzk, Freital (DE)

(73) Assignee: NXP B.V., Eindhoven (NL)

( * ) Notice: Subject to any disclaimer, the term of this patent is extended or adjusted under 35 U.S.C. 154(b) by 392 days.

(21) Appl. No.: 15/918,312

(22) Filed: Mar. 12, 2018

(65) Prior Publication Data

US 2018/0267799 A1    Sep. 20, 2018

(30) Foreign Application Priority Data

Mar. 16, 2017    (EP) .................................... 17161301

(51) Int. Cl.
*G06F 9/312* (2018.01)
*G06F 9/30* (2018.01)

(52) U.S. Cl.
CPC ...... *G06F 9/30043* (2013.01); *G06F 9/30025* (2013.01); *G06F 9/30032* (2013.01); *G06F 9/30036* (2013.01); *G06F 9/30101* (2013.01); *G06F 9/30116* (2013.01)

(58) Field of Classification Search
CPC ............. G06F 9/30025; G06F 9/30036; G06F 9/30043; G06F 9/30032; G06F 9/30101; H03M 7/30
See application file for complete search history.

(56) References Cited

U.S. PATENT DOCUMENTS

| 6,438,676 | B1 * | 8/2002 | Sijstermans | ........ G06F 9/30018 708/203 |
| 6,675,286 | B1 * | 1/2004 | Sun | ..................... G06F 9/30014 708/603 |
| 7,222,225 | B2 | 5/2007 | Hansen et al. | |
| 7,565,510 | B2 | 7/2009 | Kunie | |
| 9,959,144 | B2 | 5/2018 | Callegari et al. | |

(Continued)

FOREIGN PATENT DOCUMENTS

| TW | 201317778 A | 5/2013 |
| WO | 2015116474 A1 | 8/2015 |

OTHER PUBLICATIONS

Schlegel et al., "Fast Integer Compression using SIMD Instructions", Jun. 7, 2010, 7 pages.*

(Continued)

*Primary Examiner* — David J. Huisman (57) ABSTRACT

A microprocessor system includes a processing circuit and a memory operably coupled to the processing circuit and configured to receive input data according to a pack and store operation and output the data according to a load and unpack operation. The processing circuit comprises a hardware extension configured to: configure a variable number of bits per data element during a pack and store operation; store a concatenation of a plurality of data elements with a reduced number of bits; extract a plurality of data elements with a reduced number of bits during a load and unpacking operation; and recreate a plurality of data elements with an increased number of bits per data element representative of the data elements prior to the pack and store operation.

20 Claims, 7 Drawing Sheets

(56) References Cited

U.S. PATENT DOCUMENTS

| | | | |
|---|---|---|---|
| 2002/0002572 A1* | 1/2002 | Kanasugi | ............... H03H 17/06 |
| | | | 708/319 |
| 2003/0023646 A1* | 1/2003 | Lin | ........................... G06F 7/76 |
| | | | 708/209 |
| 2004/0073773 A1 | 4/2004 | Demjanenko | |
| 2005/0138343 A1 | 6/2005 | Liang | |
| 2015/0261534 A1* | 9/2015 | Uliel | ................... G06F 9/30145 |
| | | | 712/208 |

OTHER PUBLICATIONS

Bondalapati, K., "Dynamic Precision Management for Loop Computations on Reconfigurable Architectures", Seventh Annual Symposium on Field-Programmable Custom Computing Machines (Cat. No. PR00375), Apr. 23, 1999.

* cited by examiner

EXTENDED POINTER REGISTER FOR CONFIGURING EXECUTION OF A STORE AND PACK INSTRUCTION AND A LOAD AND UNPACK INSTRUCTION

CROSS-REFERENCE TO RELATED APPLICATIONS

This application claims the priority under 35 U.S.C. § 119 of European Patent application no. 17161301.1, filed on 16 Mar. 2017, the contents of which are incorporated by reference herein.

FIELD OF THE INVENTION

The field of the invention relates to a microprocessor system coupled to a memory and a method therefor. The invention is applicable to, but not limited to, a mechanism for storing unaligned data elements in the memory.

BACKGROUND OF THE INVENTION

In signal processing architectures, load-store units are used to transfer data between memory and processing registers (typically in both directions and often in response to load and store instructions issued by a microprocessor or a microcontroller). A load-store unit is typically a specialized hardware element. The load-store unit usually includes a queue that acts as a 'waiting area' for memory instructions, and the load-store unit itself operates independently of other processor units. Load-store units may also be used in vector processors.

In signal processing architectures, a fixed-point number representation is a real data type for a number that has a fixed number of digits after (and sometimes also before) a radix point (i.e., after the decimal point '.' in English decimal notation). A fixed-point number representation is often compared to the more complicated (and more computationally demanding) floating-point number representation. Fixed-point numbers are useful for representing fractional values, usually in base 2 or base 10, when the executing processor has no floating point unit. Alternatively, fixed-point arrays often provide improved performance or accuracy, e.g., for embedded microprocessor and microcontroller applications.

Usually integer or fixed point arrays in microprocessor and/or microcontroller applications may be declared with 8, 16, 32, 64 or 128 bits assigned to each processing element in, say, processor languages C and C++. The hardware behind the microprocessor and/or microcontroller applications, and any memory connections thereto, is configured to only recognise memory access instructions based on these data path bit lengths. However, it is often the case, for a number of the tasks that the microprocessor and/or microcontroller need(s) to perform, that a different number of bits may be sufficient to perform the task. In this scenario, an absolute value of a maximum of integer values may be anywhere between $2^8$, $2^{16}$, $2^{32}$, $2^{64}$ and $2^{128}$ and could be usefully used. Alternatively, the accuracy of fractional fixed point values may be anywhere between these $2^8$, $2^{16}$, $2^{32}$, $2^{64}$ and $2^{128}$ integer values. Thus, it is known that some 'pack and store' operations pack to 8 and 16 bits, but these 'pack values' are fixed and are always constrained to power-of-two values.

Figure 1:
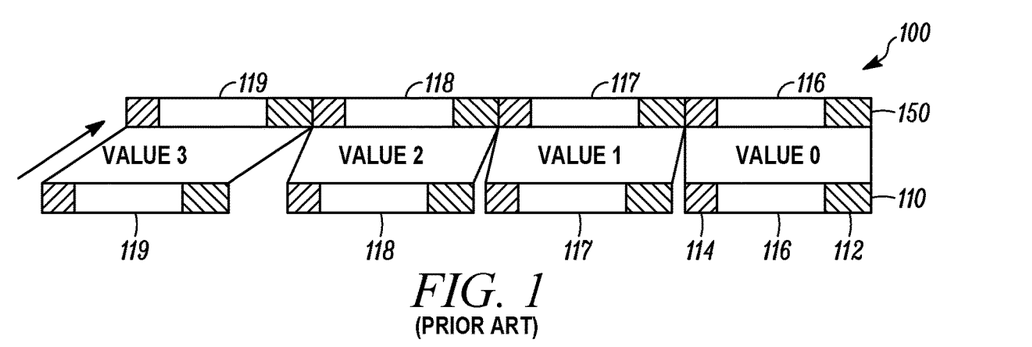
FIG. 1 illustrates a known data manipulation performed in a pack and store operation for a known microprocessor and memory arrangement.

If only a limited amount of data is capable of being stored in the memory, this may force the microprocessor or microcontroller developer to 'pack' data when storing in the limited memory. This is usually performed by special software. FIG. 1 illustrates a known bit manipulation performed in a pack and store operation for a known microprocessor and memory arrangement 100. The known microprocessor and memory arrangement 100 receives integer values in a 4-element vector register 110, ready for storing in memory in hard/fixed length memory blocks. A first value ('0') 116 includes a first portion of least significant bits (LSBs) 112 and a second portion of most significant bits (MSBs) 114. Similarly, a second value ('1') 117, a third value ('2') 118 and a fourth value ('3') 119 each also include a first portion of LSBs 112 and a second portion of MSBs 114. In a pack and store operation, the integer values in the 4-element vector register 110 are compacted in a contiguous manner into a memory location 150 after a store operation. This results in the first value ('0') 116, second value ('1') 117, third value ('2') 118 and fourth value ('3') 119 being interspersed within the memory location 150 and separated by their respective LSBs 112 and MSBs 114 that are also stored in memory location 150, as illustrated.

However, especially in signal processing systems, the operations to be performed by the microprocessor and/or microcontroller also need to be very fast. Thus, when there is a limited amount of data, it is known that a software-based solution for storing and loading a non-power-of-two number of data bits in memory may not be suitable. Furthermore, it is generally desirable to avoid implementing hardware changes to microprocessor systems. Preferably, the interface between memory and processor should also not be modified.

Known extended vector store operations are described in U.S. Pat. No. 7,565,510 B2 and U.S. Pat. No. 7,222,225 B2. Each of these two documents describe microprocessor architectures and methods for matched aligned and unaligned address storage instructions. These two documents describe similar processor extension mechanisms that allow memory access at unaligned positions. In these two documents, the overall number of bits that are required for store and load operations is equal to the number of bits for direct vector store and load. Furthermore, in these two documents, an unaligned address offset is constant, performing several consecutive executions.

Thus, there exists a need for a processor hardware extension that supports an efficient process to store and load memory arrays with an arbitrary (e.g., non-power-of-two) number of bits, preferably saving memory space and without loss of processing speed.

SUMMARY OF THE INVENTION

The present invention provides a microprocessor, a memory and a method of packing and unpacking data into/out of memory therefor, as described in the accompanying claims. Specific embodiments of the invention are set forth in the dependent claims. These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Although examples of the invention are described with reference to a microprocessor or microcontroller hardware extension that supports an efficient process to store and load memory with an arbitrary number of bits, it is envisaged that in other examples, the circuits and concepts herein described may be equally applied to a microprocessor or microcontroller hardware extension (or any firmware-based or software-based solutions) that employ the concepts described herein. Hereafter, the term microprocessor hardware extension will be used to encompass a microcontroller hardware extension in some example embodiments. Although examples of the invention are described with reference to storing and loading memory with an arbitrary number of bits, it is envisaged that, in other examples, other memory architectures may benefit from the concepts described herein.

In accordance with examples of the invention, an unaligned memory 'storing with pack' operation and/or a 'loading with unpack' operation from memory are supported using a configurable variable number of bits per data element. Such unaligned memory is supported because the number of bits to store and pack and/or load and unpack is often unequal to the align length of the memory access. Thus, in examples of the invention, a number of bits in a data element may be removed, where the number of bits being removed is configurable (i.e., is not fixed). In this manner, this example results in an unaligned offset constantly changing.

Examples of the invention are described with reference to a microprocessor system that includes a processing circuit; and a memory, operably coupled to the processing circuit and configured to receive input data according to a pack and store operation and output stored data according to a load and unpack operation. The processing circuit includes a hardware extension configured to: configure a variable number of bits per data element during a pack and store operation; store a concatenation of a plurality of data elements with a reduced number of bits; extract a plurality of data elements with a reduced number of bits during a load and unpacking operation; and recreate a plurality of data elements with an increased number of bits per data element representative of the data elements prior to the pack and store operation. In this manner, only new processor instructions need to be added to an existing processor-memory architecture, in order to facilitate a load and store operation to memory elements without losing processing speed compared to known load and store operations. Using such new processor load and store instructions may provide significant benefits, for example by reducing a number of instructions in a 'pack' operation.

Although examples of the invention are described with reference to an implementation that uses vector processors that are capable of loading and storing several array elements during one instruction execution, it is envisaged that the concepts described herein are equally applicable to a realization with other processor types, such as scalar processors, superscalar processors, single uni-core processor executing a single instruction stream, single data stream (SISD), etc.

Some examples of the invention may provide a number of bits per element that can be configured in run time. For example, at run time, a determination (or calculation) of the required accuracy may be made, based on previous processing. Following this determination, a suitable amount of memory may be allocated (e.g., using a 'C' library function 'malloc'), where the used memory length (or used memory length per data element) may be dependent upon the accuracy, for example (numBits*numArrayElements in 'C'). Thereafter, further processing may be performed using the freed up memory (or buffer).

In some examples, a determination of the required accuracy may be decided and/or configured on a per-use or per-application basis. In some examples, the application code may be performed multiple times on the hardware extension in order to identify the accuracy obtained on each iteration of the application code. If one of the iterations results in an acceptable accuracy, the settings used may be adopted as the final decision. This value may then be fixed, e.g., defined by the 'C' programmer, and in some examples these values may be valid for one functional operation (including one or more function calls). In other examples, one or more fixed defined accuracy/ies may be used, where the same function may be called based on a selected accuracy (from a range of different fixed accuracies supported).

Advantageously, the use of a configurable number of bits using a single instruction may be achieved without increasing processor load. Thus, in this manner, there is no longer an implication on processor load during the memory storing that packs operation and loading with unpacks operations.

In accordance with examples of the invention, a hardware extension is employed with the microprocessor, hereinafter sometimes termed 'processor'. In some examples, the hardware extension may be configured to perform one or more of a data/bit shifting operation, a packing and store operation, a load and unpack operation, etc., using only a single instruction. In this manner, there is no longer an impact on processor load during a memory store or unpack operation, which results in a saving of a separate shift operation and therefore decreases the processor load.

In some optional examples, a configurable shift operation, before packing, allows the programmer to choose the bits of interest. In some examples, a programmer or developer when applying the concepts described herein may combine one or more equivalent operations, e.g., 'divide by 32(=2^5)', 'shift right by 5', 'remove 5 LSBs', which are each functionally equivalent operations. Thus, as shifting right is an equivalent operation to removing LSBs, a last arithmetic operation of such a shift operation may be combined, say, with a LSB removal in the proposed pack and store instruction, thereby saving existing shift instructions. In this manner, multiple instructions may be combined into a single instruction in order to reduce processor load.

In some optional examples, the same processing function may be called several times and in some examples may use a different number of bits on each successive calling. In some optional examples, several input and output memories may be used using a different number of bits each time. In some optional examples, existing software code may be easily adapted, e.g., in 'C' or 'C++' language, in order to support this processor feature.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A second aspect of the invention includes a method for a microprocessor system comprising a processing circuit with a hardware extension operably coupled to a memory. The method includes receiving input data in a form of data elements having a number of bits; configuring a variable number of bits per data element during a pack and store operation; storing a concatenation of a plurality of data elements with a reduced number of bits; extracting a plurality of data elements with a reduced number of bits during a load and unpacking operation; and recreating a plurality of data elements with an increased number of bits per data element representative of the data elements prior to the pack and store operation.

Figure 2:
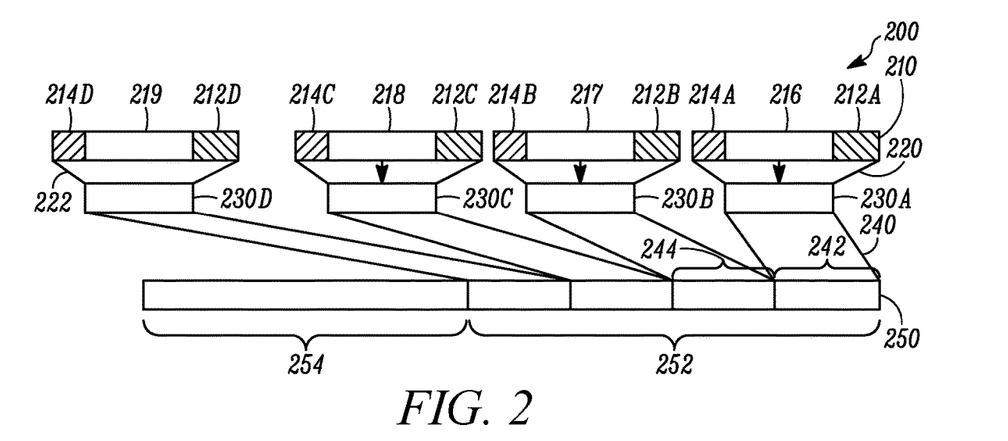
FIG. 2 illustrates an overview of data manipulation performed in both a pack and store operation and later in a load and unpack operation, according to example embodiments of the invention.

Referring now to FIG. 2, an overview of the data manipulation performed in a pack and store operation 200 (replicated in reverse in a later load and unpack operation) is illustrated, according to example embodiments of the invention. For ease of explanation, the data manipulation performed in a pack and store operation 200 receives integer values in a 4-element vector register 210. Although FIG. 2 only illustrates a 4-element vector register 210 for clarity purposes only, it is envisaged that in practice thousands of values may be used in a buffer. Advantageously, as several buffers may be employed in pack mode of operation, a lot of data memory may be freed. Alternatively, at a design phase and utilising examples of the invention, a design with less memory may be adopted, in order to save costs.

In accordance with examples of the invention, an identification of the useful bits of integer values in the 4-element vector register 210 has been made. A first value ('0') 216 includes a first portion 212A of LSBs and a second portion 214A of MSBs. Similarly, a second value ('1') 217, a third value ('2') 218 and a fourth value ('3') 219 each includes a first portion 212B, 212C and 212D, respectively, of LSBs and a second portion 214B, 214C and 214D, respectively, of MSBs. In a pack and store operation, the integer values in the 4-element vector register 210 are compacted in a contiguous manner into a memory location 250, after a store operation. However, in accordance with example embodiments of the invention, the useful (or essential) bits of data are stored. In this example, if an absolute value of a total of the integer values from the first value ('0') 216, second value ('1') 217, third value ('2') 218 and fourth value ('3') 219 is low enough to fit into the new (compacted) memory size that is available, then the LSBs and MSBs are removed, for example during a conversion 220 of a 16-bit data word to 1 . . . 15 bits. If an absolute value of the total of the integer values is not low enough to comply with the new (compacted) memory size that is available, then saturation 222 may be employed. In this 'saturation' case the converted value may be the largest or smallest possible value depending on the sign. The number of the MSBs (left hand side bits of each vector register element of the 4-element vector register 210) that is removed may also be configured. In one example, the MSBs may be removed because the dynamic range of all the possible values that can occur during this buffer may be lower than the supported range in a processor register.

Similarly, in some examples, the LSBs (at the right hand side of each vector register element of the 4-element vector register 210 may be neglected, e.g., because the full accuracy is not required. During a removal of the LSBs, rounding may be enabled.

In some examples, a number of MSB or LSB bits that may be removed can be set directly in a calculation function, which in some examples is a function defined within a 'C' language program that performs a calculation, such as perform some arithmetic, perform signal processing, etc. However, in other examples, the number of MSB or LSB bits that may be removed may be defined before the calculations. In some examples, a maximum of an available memory space for the data/values may be known beforehand. In some examples, a required accuracy of the stored data bits may be known beforehand too. In some examples, a memory region (of, say, a defined length) may be divided into several buffers, each potentially having a different number of bits allocated for the calculation results. For example, a new feature may require a new buffer in this memory. Thereafter, one or more existing buffers may be reduced, say, by decreasing a number of bits to store data in these buffers to thereby allow this new buffer to be inserted. In some examples, this decision of how many bits to remove may be performed by the software developer. In some examples, a number of MSBs or LSBs may be specifically selected to be removed in order to achieve a certain accuracy. A consequence of removing the MSBs and the LSBs is that solely the first value ('0') 216, second value ('1') 217, third value ('2') 218 and fourth value ('3') 219 are transferred to registers 230A, 230B, 230C and 230D. Registers 230A, 230B, 230C and 230D are then, advantageously, stored to memory location 250 in a compacted manner 240. Thus, the first value ('0') 216 is stored in a first part 242 of memory location 250 contiguous with the second value ('1') 217 stored in a second part 244 of the memory location 250, and so on. Notably, a number or all of the respective LSBs and/or MSBs are not stored in memory location 250, as illustrated. This results in an overall smaller portion 252 of memory location 250 being used, and a saved memory space 254.

Although FIG. 2 illustrates an overview of the data manipulation performed in a pack and store operation, it is envisaged that the reverse operation is performed subsequently in a load and unpack operation, according to example embodiments of the invention.

Figure 3:
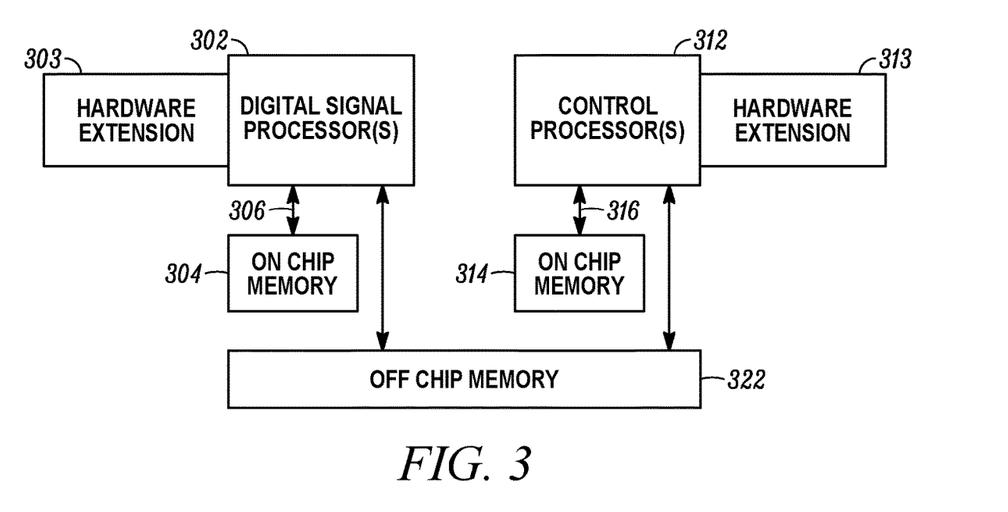
FIG. 3 illustrates an overview of a processor and memory arrangement, according to example embodiments of the invention.

Referring next to FIG. 3, a simplified high-level example of a microprocessor architecture 300 is illustrated, according to example embodiments of the invention. The high-level example of a microprocessor architecture 300 includes a Digital Signal Processor (DSP) circuit 302 coupled via bus 306 to on-chip memory 304. The example microprocessor architecture 300 also includes one or more Control Processor circuit(s) 312 coupled via bus 316 to further on-chip memory 314. In some examples, off-chip memory 322 may also be connected to the DSP circuit 302 and/or the one or more Control Processor circuit(s) 312. According to some examples of the invention, DSP circuit 302 and/or Control Processor circuit(s) 312 are adapted to perform vector processing of data and include hardware extension circuit(s), hereinafter, "hardware extension(s)", 303, 313 respectively. In this example, the DSP circuit 302 may include one or more DSPs and be configured to contain the software and specialized functional units (hardware) to realize the hardware extension 303 of a processor-memory architecture. However, in other examples, the DSP circuit 302 may be replaced by the one or more Control Processor circuit(s) 312 that is configured to implement the hardware extension 313 of a controller-memory architecture. In accordance with examples of the invention, the pack and store operation (and subsequent load and unpack operation) may relate to the packing and storing of integer values (in a form of bits) in on-chip memory 304, 314 and/or external off-chip memory 322.

Thus, if the data memory is on-chip memory 304, and thus directly connected to the DSP circuit 302, the size of the on-chip memory 304 is typically limited. Here, packing is particularly important, as the packing limitation depends on a clock frequency of the processor and a number of pipeline stages. Otherwise, if an external off-chip memory 322 cache is used, the size of the required cache may be reduced by employing the example concept herein described.

A skilled artisan will appreciate that the level of integration of circuits or components may be, in some instances, implementation-dependent. Furthermore, it is envisaged that some examples may use either a digital signal processor or a control processor (or microcontroller), but not both. Clearly, the various components within the architecture can be realized in discrete or integrated component form, with an ultimate structure therefore being an application-specific or design selection.

In some examples, the hardware extension 303, 313 is capable of receiving a single processor instruction that supports different packing modes/operations, e.g., different value lengths, following different numbers of MSB/LSB bits being removed. In some examples, the single processor instruction may be implemented in 'C' software language, where parameters such as 'pointer to input buffer', 'pointer to output buffer', and 'number of bits per element in input and output buffer' may be supported. In this manner, a required accuracy and dynamic range for some application parameters may be achieved for software function calls. Advantageously, no extra instruction memory is required to perform some of the concepts described herein.

In some examples, the hardware extension 303, 313 enables a pack and store operation to be implemented in a single processor instruction. In this manner, the runtime of the software may not be increased. In some examples, the hardware extension may also enable a load and unpack operation to also In some examples, the hardware extension 303, 313 may also enable a load and unpack operation to also be implemented in a single processor instruction.

Figure 4A:
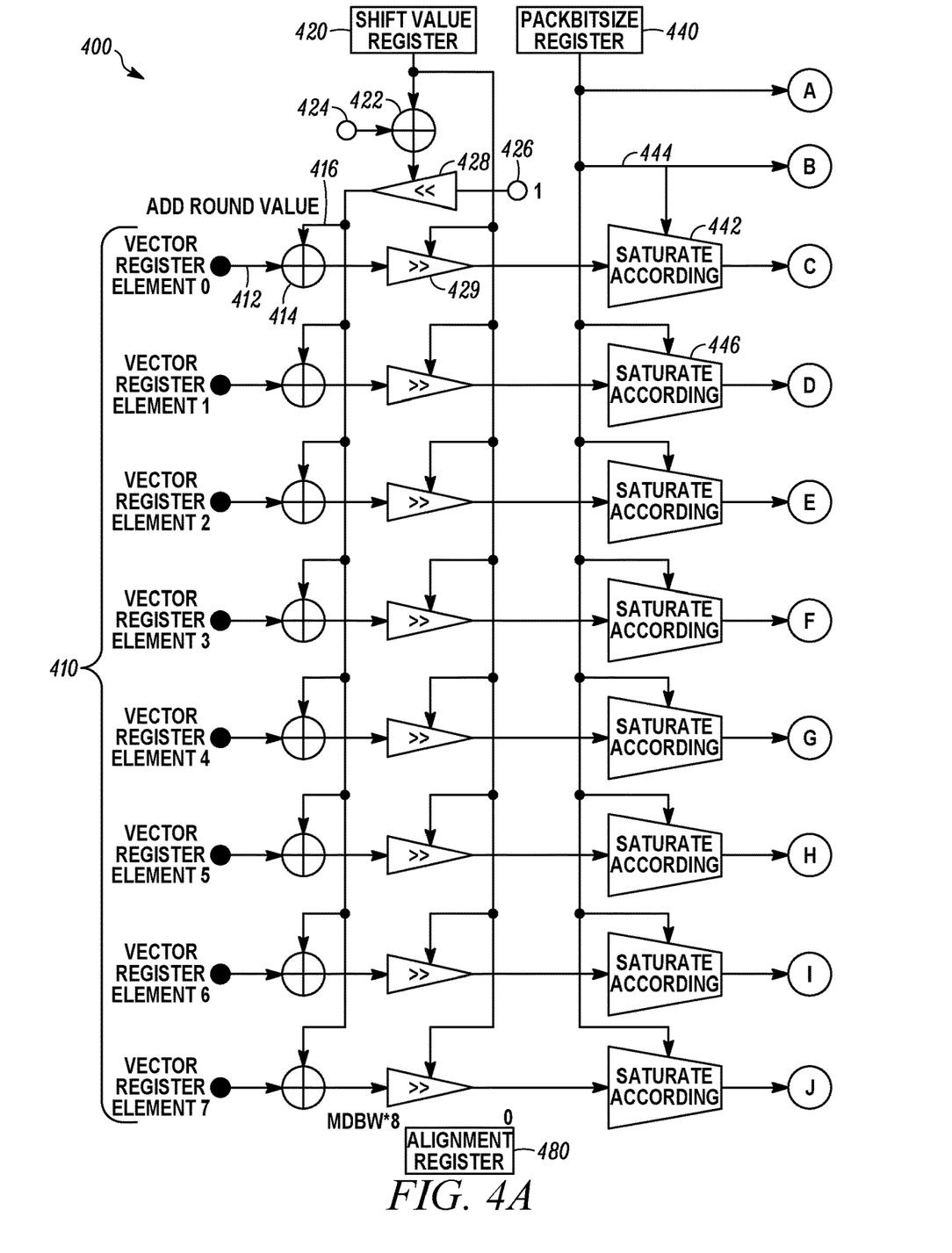
FIGS. 4A-4B illustrate an example of a hardware extension of a processor and memory arrangement used in a pack and store operation, according to example embodiments of the invention.
Figure 4B:
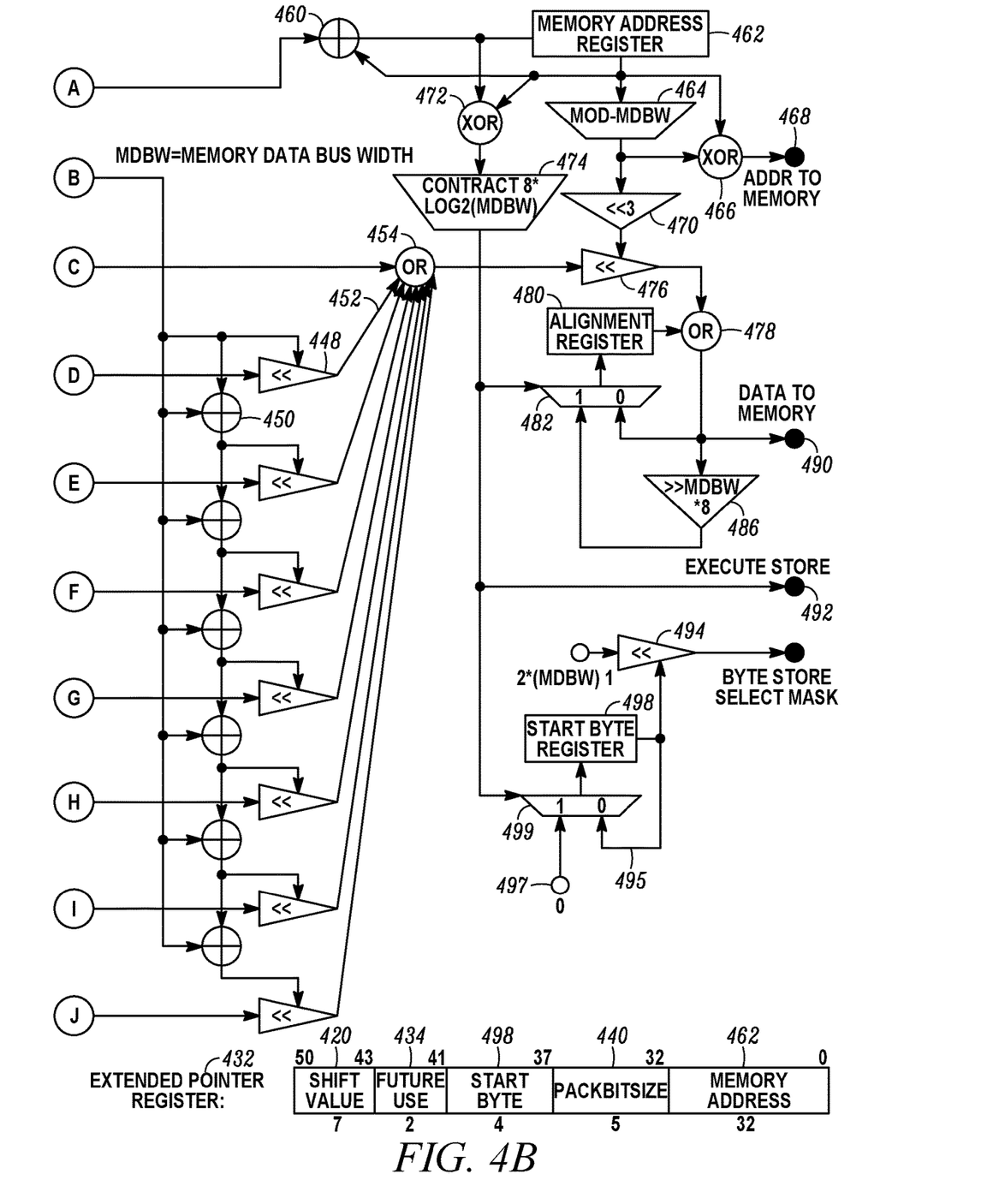

Data Packing During the Store Instruction:

FIGS. 4A and 4B illustrate an example of a hardware extension 303, 313 of a processor and memory arrangement 400 used in a pack and store operation, according to embodiments of the invention. In this example, the hardware extension 303, 313 is used partially in an application related to a use of "softbits". Here, an 8-element vector register 410 is employed. Each vector register element 412 of the 8-element vector register 410 inputs a bit into a summing junction 414, where a rounding value 416 may be added. The operation of only one of the parallel vector elements 412 will be described for clarity purposes only.

In one example, a "round half up" operation may be performed, as described in en.wikipedia.org/wiki/Rounding. In this example, the rounding value 416 is the representation of '0.5' before shifting. Without rounding the deviation between the used LSB bits removal and an ideal floating point division is '−1 . . . 0'. With rounding the deviation between the used LSB bits removal and an ideal floating point division is −0.5 . . . +0.5. As will be appreciated by a skilled artisan, this has some advantages in signal processing.

The option to use a rounding value 416 is dictated by a shift value field 420 that provides an input value to a summing junction 422, where it is added to a negative value 424. The output of the summing junction controls a left shifter buffer 428 that receives a positive '1' 426, and produces the rounding value 416: 2^(shiftValue−1). An output from each of the summing junctions 414, connected to respective vector register elements (e.g., vector register element 412) is provided to respective second right shifter buffers 429. This is the LSB removing step. The respective right shifter buffer(s) 429 pass(es) the respective bits (which may be rounded versions thereof) from vector register elements 412 depending on the shift value field 420. Thus, in this manner, shift value field 420 defines the number of LSB bits to remove.

The outputs from the right shifter buffer 429 are input to optional saturation functions 442, 446 . . . associated with each vector register element 412 of the 8-element vector register 410 and controllable by a control signal 444 from a 'packBitSize' field 440. If an absolute value of the integer value of the respective vector register element 412 is low enough to fit into the new reduced memory size, then the MSBs (say, at the left hand side of the values in FIG. 2) may be removed so as to only have a specific number of 'packBitSize' bits after this operation. Otherwise, saturation 222 using the optional saturation function 442, 446 may be required. In this case, the converted value may be the largest or smallest possible value depending on the sign. In this example, the number of the MSBs to be removed is the number of bits per vector register element 412 minus 'shiftValue' minus 'packBitSize'. The respective outputs from the optional saturation functions 442, 446 are then shifted left by left shifter buffers 448, to obtain the start bit positions 0, packBitSize, 2*packBitSize, 3*packBitSize, 4*packBitSize, 5*packBitSize, 6*packBitSize, 7*packBitSize. The multiplication of 'packBitSize' is shown using adders 450. The outputs 452 from each of the respective left shifter buffers 448 is input to an 'OR' gate 454, which is used to concatenate all the useful bits of all eight vector register elements 412. After the 'OR' gate 454, the number of useful bits is 8*'packBitSize'.

An alignment register 480 and an extended pointer register 432 are input and output registers for the instruction. The 8-element vector register 410 at the left hand side is an input-only register. The alignment register 480 is configured to collect useful bits until enough bits are available (8*MDBW) to execute a 'store' operation.

In this example, the extended pointer register 432 includes the 7-bit shift value field 420 that configures initial shifting (together with rounding) at the beginning of the processing of the vector register elements 412. The extended pointer register 432 further includes a 2-bit 'Reserved for Future Use' (RFU) field 434, and a 4-bit startByte field 498 that contains some LSB bits of the initial start address of the buffer to write to, until the first store action was performed. After that, the buffer will contain zero. In some examples here, the intention is to prevent over-writing data in the buffer if the start address is unaligned. The extended pointer register 432 further includes the 5-bit 'packBitSize' field 440 that defines the number of bits to store for one vector register element 412, and a 32-bit memory address field 462 that contains a current virtual address for storing data. In this configuration, there are no alignment restrictions. In contrast, a physical address 468 passed to memory is always a multiple of the memory data bus width (MDBW). The MDBW defines how many bytes can be stored and loaded with the connected memory. The MDBW is always a power based on '2'. In this example the MDBW is 16 bits in length. Thus, MDBW*8 is the number of bits at the memory data interface and it is 128 bits in the example.

In this example, the summing junction 460 calculates the next virtual address to use. Thereafter, the old (virtual) address and the new address are compared using XOR gate 472, and bit number of log 2(MDBW) is extracted in operation 474. When a jump over a valid aligned physical address is detected in 474, this can be used directly to either:
  (i) execute a store operation 492;
  (ii) clear, via input 497, the 'startByte' 498 using left shifter 494, input 495 and multiplexer 499;
  (iii) remove all the collected data bits in 'align' register 480, which are being stored in data-to-memory at 490, and shifted right by right shifter 486. The remaining bits are input to the beginning of 'align' register 480. Multiplexer 482 is configured to perform this decision.

The number of (MDBW) bits at LSB of old (virtual) address (input to MDBW modulus operation 464) determines how to combine the previously collected data bits in 'align' register 480 with new data bits from current vector register elements 412, after the 'OR' gate 454. The output of the MDBW modulus operation 464 is the number of collected data bytes, after shifting left by 3 (which equals a multiplication by '8') by left shifter buffer 470, the output of which is the number of collected data bits. The new data has to be shifted left, in operation 476, to the end of the existing collected bits. Then, both sets of data can be concatenated using 'OR' logic gate 478. In this example, the MDBW modulus operation 464 and XOR logic gate 466 are configured to convert the virtual address to a valid physical address 468 by clearing the MDBW bits at LSB.

In this example, it is envisaged that operations of both pack and store, as well as unpack and load, may be performed at run time by the software. For example, in a case of a digital (e.g., finite impulse response (FIR)) filter implemented as a 'C' function, the hardware architecture may be configured to use one buffer for input and one buffer for output. Usually, the function parameters are pointers to the buffers, and the number of elements to process may be additionally the FIR-state. If this 'C' function is implemented using the proposed pack and unpack instructions, as described further with respect to FIGS. 5A and 5B, additional parameters that may be supported may include, for example:
  (i) A number of bits per element used in the input buffer;
  (ii) A number of bits per element to use in the output buffer;
  (iii) A number of LSB aligned bits to remove during packing.

Thus, these three ((i)-(iii)) example parameters may provide a type of configuration of this FIR filter. Such a filter will often be used several times in an application and therefore re-called. However, a different accuracy of the filter may be required upon each calling, as and when a different FIR filter 'C' function is called. The re-configuration of this accuracy can thus be achieved using one or more of these parameters. Hence, in this example, only one 'C' function instruction may be advantageously used to support different modes of packing and unpacking, as well as support different levels of accuracy.

One Example of 'C' Code for Pack and Store Operation:

```
Config_Pack(...) // number of LSB and/or MSB bits to remove (right hand
side and left hand side)
For ( ... ) {
    ...
    Pack_and_Store( ... ); // Compiler translates this to one CPU
                          // instruction doing pack, store and
                          pointer increment
}
```

Figure 5A:
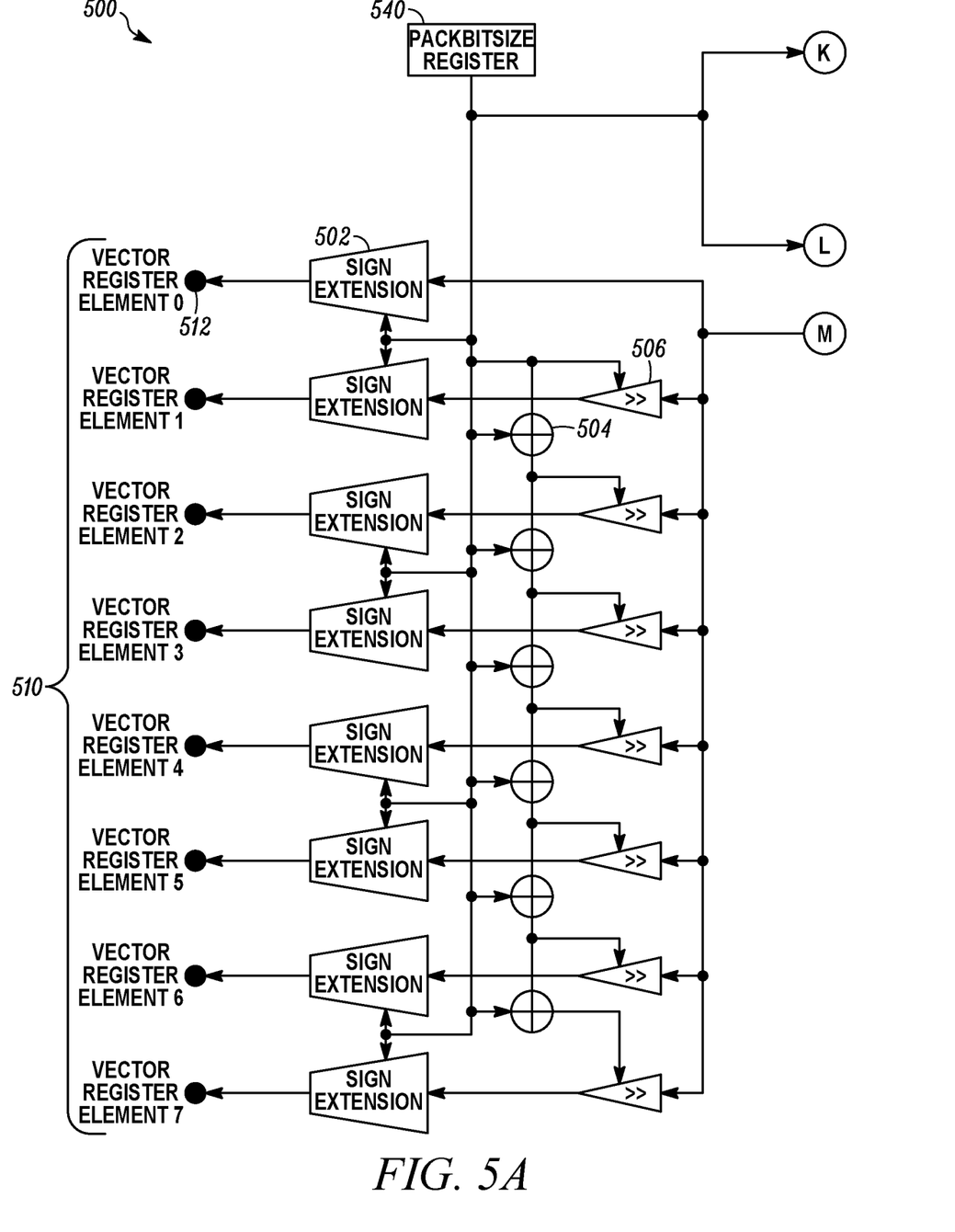
FIGS. 5A-5B illustrate an example of a hardware extension of a processor and memory arrangement, used in a load and unpack operation, according to example embodiments of the invention.
Figure 5B:
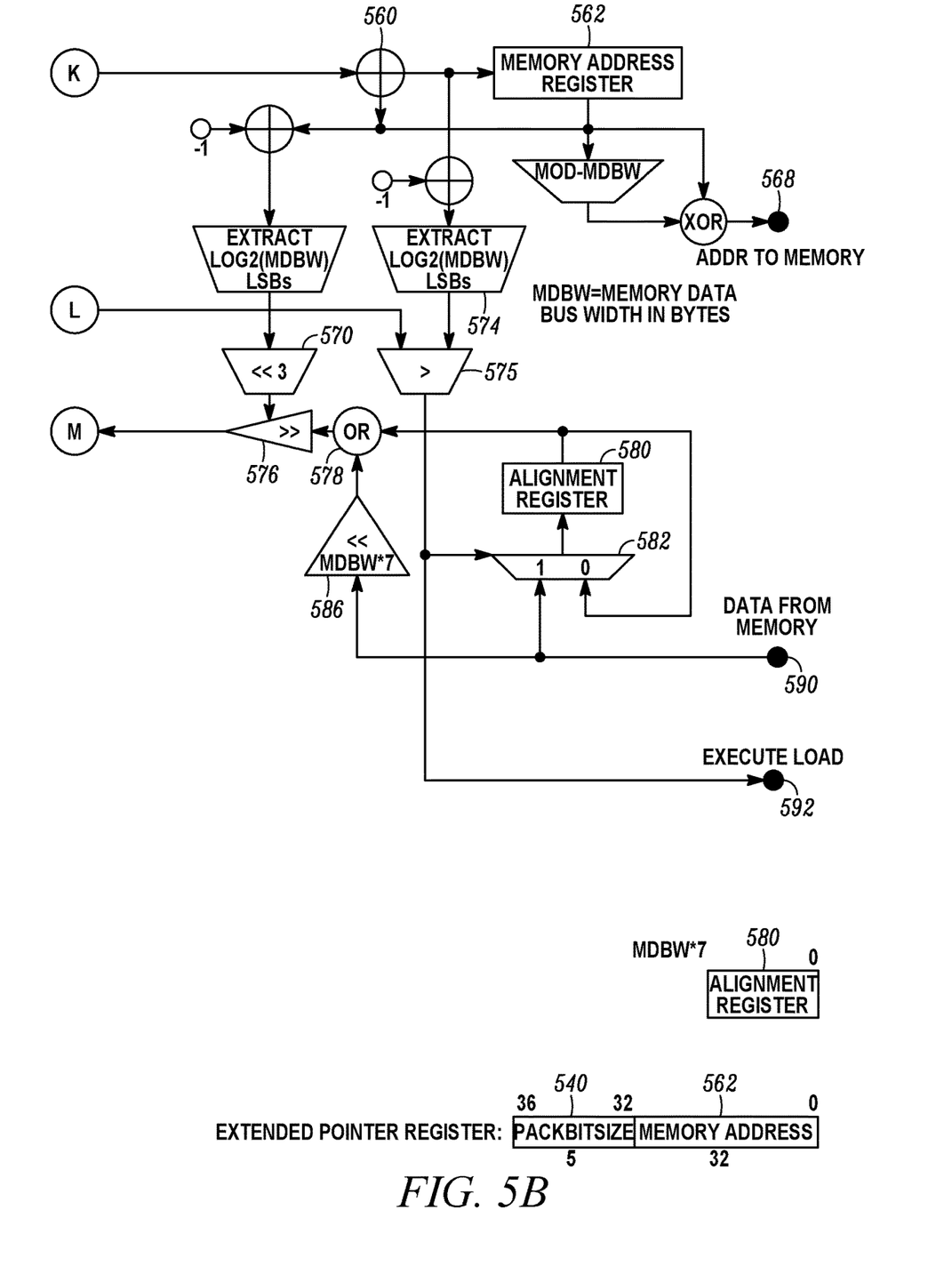

Data Unpacking During the Load Instruction:

Referring now to FIGS. 5A and 5B, a further example of a hardware extension 303, 313 of a processor and memory arrangement 500 used in a load and unpack operation (i.e., memory to the 8-bit vector register 210) is illustrated according to-embodiments of the invention. In FIG. 5B, the address to memory 568 is the aligned address calculated based on a virtual address in a 32-bit memory address field 562, as in the 32-bit memory address field 462 in FIG. 4B. Again, summing junction 560 calculates a new virtual address in the 32-bit memory address field 562 which is input to modulus operation 573.

In examples of the invention, if the decrement of the log 2(MDBW) LSBs 574 of the new virtual address in the 32-bit memory address field 562 is lower than 'packBitSize' 540, a jump 575 over an aligned physical address is occurring. In this case a physical 'load' instruction 592 will be executed. Also, at multiplexer 582, the content of the 'align' register 580 will be completely overwritten by the received data from the memory 590. The useful bits are extracted either only from the 'align' register 580, or from a combination of this and currently received data from the memory 590. The concatenation is performed by left shifter buffer 586 and 'OR' logic gate 578.

The extraction of the useful bits is performed by the left shifter buffer 570. The shift value therefore is the decrement of the log 2(MDBW) LSBs 574 of the old address in the 32-bit memory address field 562, i.e., the old address multiplied by '8' in this example by using left shifter buffer 570. At the output of the right shifter buffer 576, all required bits for all target vector register elements of the 8-element vector register 510 are available, starting with vector register element '0' 512 at the LSB. To have the useful bits for all elements LSBs aligned at the output of the right shifter buffer 576, the data has to be right shifted by several right shifter buffers 506 by packBitSize, 2*packBitSize, 3*packBitSize, 4*packBitSize, 5*packBitSize, 6*packBitSize, and 7*packBitSize, respectively. The shift values therefore are shown not with multipliers but with several adders 504 in FIG. 5A. The final operation is the sign extension 502.

In detail, the bit number 'packBitSize' 540-1 is the sign bit of the integer representation of the desired values. This has to be replicated ((bit size of an element) minus 'packbitSize') at the left side of bit position 'packBitSize'−1.

In some examples, in contrast to using the known 'BITAND', 'BITSHIFT' and 'BITOR' operations, which take a relatively long processing time, a special load instruction that includes an unpack operation may be employed by a processor hardware extension, e.g., processor hardware extension 303 of FIG. 3, when extracting the packed data from memory. In this manner, a much shorter processing time is used. One benefit of performing this operation with the known 'BITAND', 'BITSHIFT' and 'BITOR' operations is to save the additional logic in the processor, as well as to save silicon area. In other examples, it is envisaged that other hardware may be added between the processor and the memory to perform the same functional operations as described herein.

In this 'memory to vector register' direction, in some examples, zero bits may be added at the right hand side (at the LSBs) and using only unsigned value format. Usually, for signed values, two's complement format is used. In some alternative examples, a sign bit (e.g., the MSB) may be repeated at the left hand side (MSB) as described in en.wikipedia.org/wiki/Sign_extension, in a 'padding' manner. In some alternative examples, a combination of both techniques may be applied. This may be configured in software.

In accordance with example embodiments, a software developer does not need to know much about the internal hardware configuration of the processor hardware extension 303, 313. Usually, vector store operations with automatic pointer increment are used. The new proposed store and load operations have nearly equal interfaces. In accordance with example embodiments, a new store instruction includes removing of a configurable number of bits at both the left and right hand side of the data values, including performing a switchable 'rounding' and/or 'saturation' process. In some examples, the hardware extension 303, 313 includes a hidden small hardware buffer that is configured to collect a fewer number of bits than a known store instruction. In this example, the small hardware buffer is referred to as 'hidden', as registers 480 in FIG. 4B and 580 in FIG. 5B may be used inside the described instruction. There is no direct manipulation of registers 480, 580 that is available to the software developer or programmer. In some examples, a pointer increment may be performed, dependent upon the configuration regarding the number of bits to be used or removed. One Example of 'C' Code for Load and Unpack Operation:

```
Config_Unpack(...) //number of bits per element in memory, position in register
For ( ... ) {
    Load_and_Unpack( ... ); // Compiler translates this to one
                            // CPU instruction doing load,
                            unpack, and pointer increment
    ...
}
```

Figure 6:
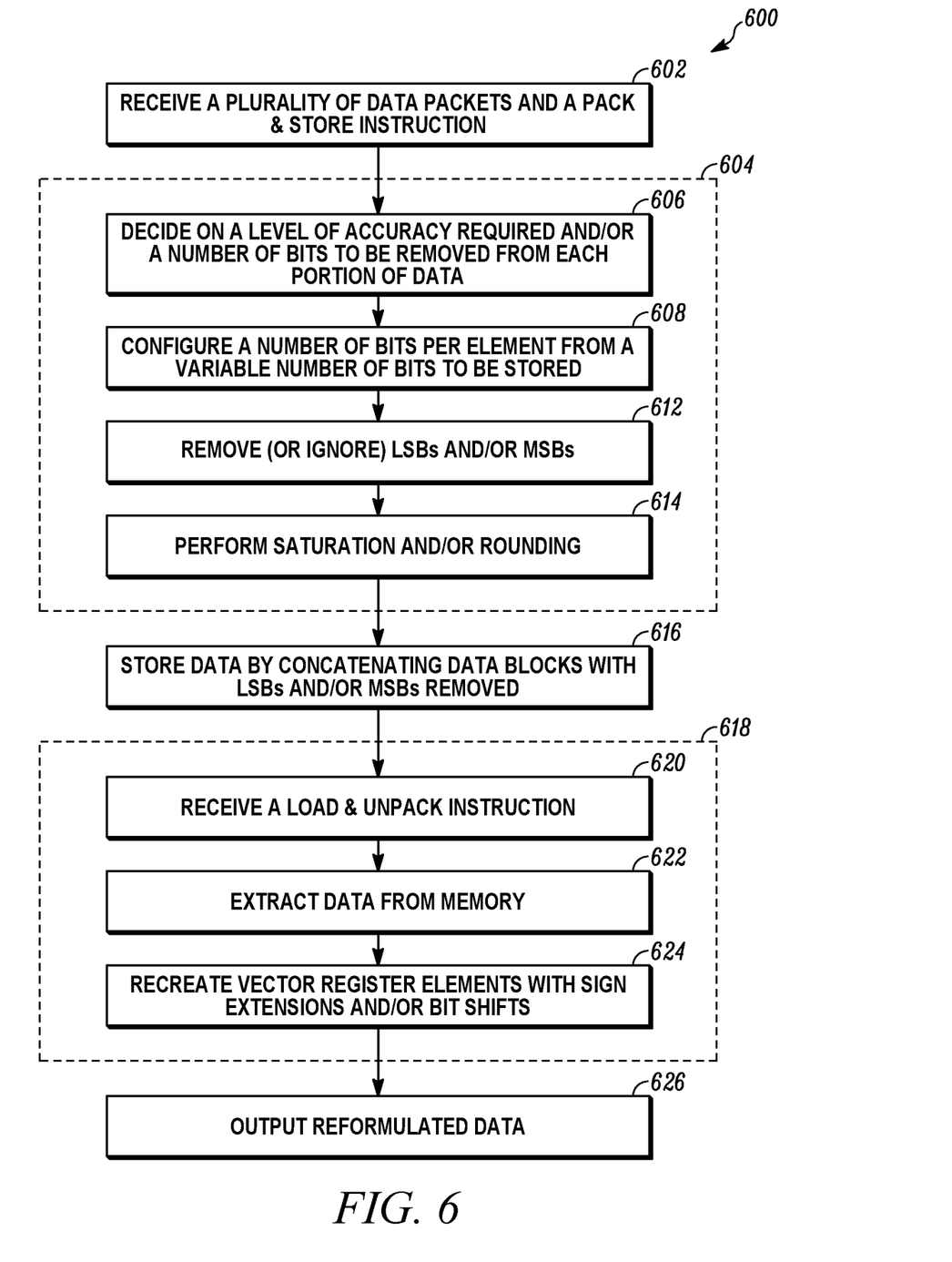
FIG. 6 illustrates an example of pack & store and load & unpack operations, according to example embodiments of the invention.

Referring now to FIG. 6, an example flowchart 600 illustrates both pack & store and load & unpack operations, according to example embodiments of the invention. At 602, the flowchart commences with a plurality of data packets in a form of data elements having a number of bits being received with a pack & store instruction. A pack & store operation is then performed at 604. The pack & store operation at 604 includes, at 606, a decision on a level of accuracy required and/or a number of bits to be removed from each portion of data during the pack & store operation. At 608 a number of bits per register element is configured, from a variable number of bits to be stored. At 612, the flowchart moves to a removal (or ignoring) of a selected number of bits, e.g., LSBs and/or MSBs, from the received data packets. At 614, the flowchart moves to optionally performing saturation and/or rounding. In this example, and at 616, the (reduced) data is stored by concatenating data blocks, with the LSBs and/or MSBs removed.

At a subsequent time, when the stored data is called for, a load & unpack operation is then performed at 618. At 620, the load & unpack instruction is received and at 622, the data extracted from memory. At 624 the vector register elements are recreated, for example using sign extensions and/or bit shifts. At 626 the reformulated data is output.

As indicated, it is envisaged that the examples of the invention employing a processor-memory arrangement may be used in a wide variety of applications, such as in radio or TV receivers, vehicle to vehicle communications, radar or Lidar (i.e., a detection system that works on the principle of radar, but uses light from a laser) applications, etc. In some examples, the number of bits to be removed may be decided by the application programmer, for example depending upon, say, an expected maximum dynamic range, required accuracy, available memory, etc.

Figure 7:
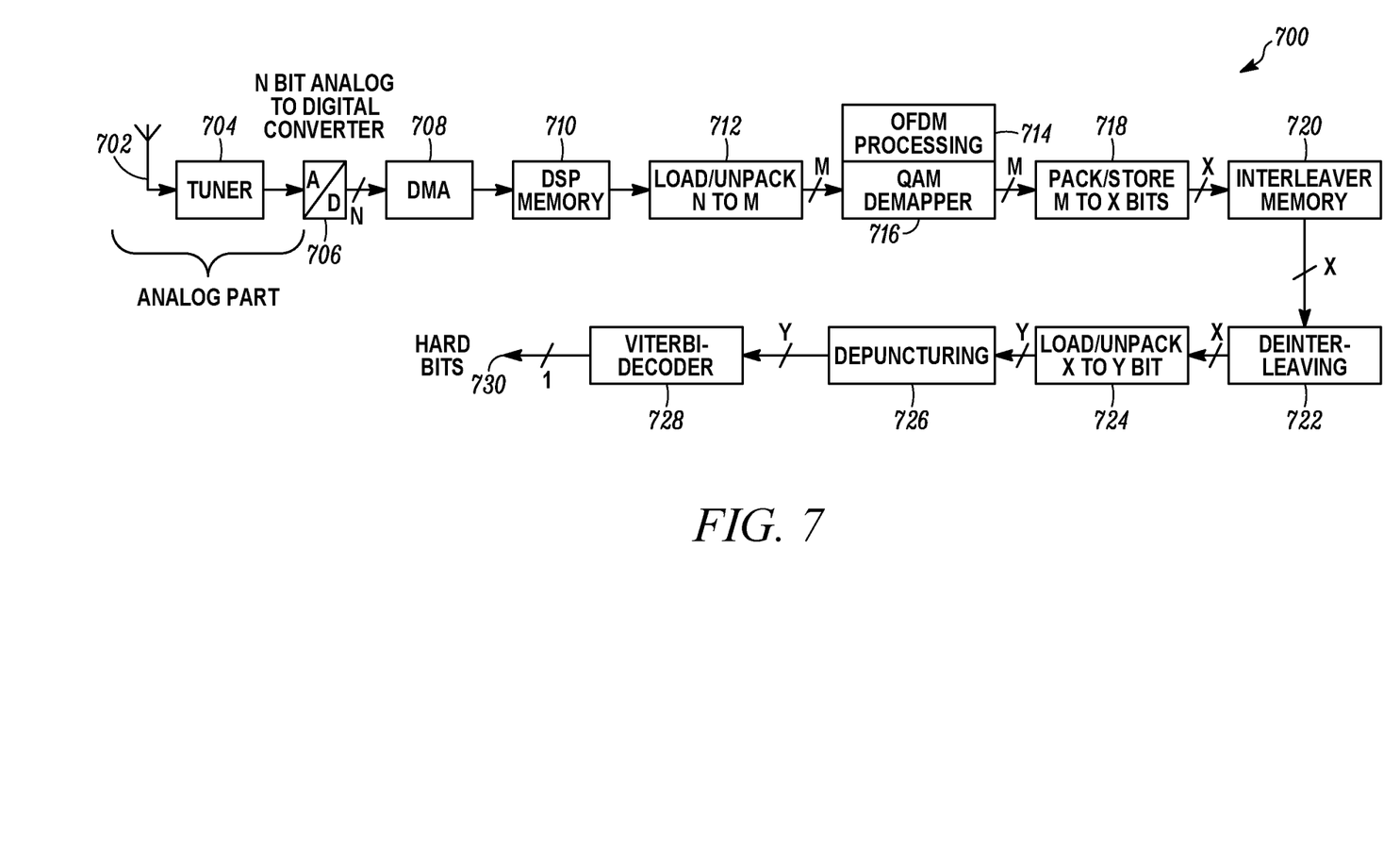
FIG. 7 illustrates an example architecture that utilises pack & store and load & unpack operations, according to example embodiments of the invention.

Referring now to FIG. 7, an example architecture 700 that utilises pack & store and load & unpack operations of a processor and memory arrangement is illustrated, according to example embodiments of the invention. The example architecture 700 is one such wireless communication unit that includes an antenna 702 that is coupled to a radio frequency front-end or tuner 704 that receives an analog signal. A recovered analog signal is converted into a N-bit digital data stream in analog-to-digital converter (ADC) 706. The N-bit digital data stream is applied via direct memory access element (DMA) 708 to a digital signal processor (DSP) memory 710, which allows hardware subsystems, e.g., the hardware extensions 303 and 313, to access system memory independently of a central processing unit. The N-bit digital data stream is stored in memory using a load-unpack operation 712 that converts the 'N' bits per data element to 'M' bits per data element, for example converting 12-bits to 16-bit data elements. In one example of a wireless communication unit, the 16-bit data elements may require further processing, for example using orthogonal frequency division multiplexed processing 714 and quadrature amplitude de-mapping 716. After this digital signal processing, the 'M' bits may, in this example, be subject to a pack and store operation in 718, where the 'M' bits per data element are stored as 'X' bits per data element into an interleaver memory 720. At some instance in time, the data is further processed by de-interleaver 722 and subject to a load and unpack operation at 724, converting the 'X' bits per data element into a 'Y' bits per data element data sequence. In this example, this 'Y' bits per data element data sequence is de-punctured at 726 and decoded in Viterbi decoder 728 to produce a sequence of single hard bit outputs 730.

Thus, an application programmer may be able to use data from, say, a 10-bit analog to digital converter that is stored in a buffer. In this example, only 10 bits instead of 16 bits per register element needs to be reserved in the buffer. Alternatively, in, say, a Viterbi decoder application and assuming a Viterbi decoder hardware block that operates with a 6-bit input, the storage buffer may be configured to used 6-bits instead of, say, a usual 8-bits. In a yet further alternative application, for example in an orthogonal frequency division multiplex (OFDM) receiver, several channel estimation results may have to be stored for each type of reception improvement. This would ordinarily require a lot of memory. Reducing the accuracy of this stored data would have only a minor effect on the reception performance, and therefore several LSB s may be removed during the storing process.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected' or 'operably coupled' to each other to achieve the desired functionality.

Furthermore, those skilled in the art will recognize that boundaries between the above described operations merely illustrative. The multiple operations may be combined into a single operation, a single operation may be distributed to additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'embedded systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A microprocessor system comprising:
   a processing circuit for running a 'C' function on the microprocessor system; and
   a memory, operably coupled to the processing circuit, configured to receive input data in a form of data elements according to a pack and store operation and to output stored data according to a load and unpack operation, wherein the 'C' function employs the input data,
   wherein the processing circuit includes a hardware extension configured to:
      implement an extended pointer register for both i) the pack and store operation and ii) the load and unpack operation, the extended pointer register including each of a shiftvalue field for configuring shifting operation, a startbyte field for an initial starting address of a buffer to write, and a packbitsize field that defines a number of bits to store in which the number of bits is any value between zero and a number of bits in the data elements including non-power-of-two values,
      determine a required accuracy of the 'C' function,
      configure, in the packbitsize field, a variable number of bits to store per data element during the pack and store operation, thereby creating reduced data elements representative of the input data, each reduced data element having a reduced number of bits,
      allocate to the 'C' function, based on the determined required accuracy, an amount of the memory as 'C' function memory,
      store in the 'C' function memory, using the extended pointer register, a concatenation of a plurality of the reduced data elements, and
      extract from the 'C' function memory, using the extended pointer register, the concatenation of a plurality of the reduced data elements during the load and unpack operation.

2. The microprocessor system of claim 1 wherein the 'C' function configures a variable number of bits per element during a processor run time.

3. The microprocessor system of claim 1 wherein the required accuracy is determined by the hardware extension performing code of the 'C' function multiple times and identifying an accuracy on each iteration thereof.

4. The microprocessor system of claim 1 wherein the processing circuit uses only one instruction to configure, in the packbitsize field, the variable number of bits to store per data element during the pack and store operation.

5. The microprocessor system of claim 1 wherein the processing circuit performs at least one of: the pack and store operation using only one instruction, and the load and unpack operation using only one instruction.

6. The microprocessor system of claim 1 wherein the hardware extension is configured to support multiple modes of pack and store or load and unpack, wherein the multiple modes include different value lengths of the stored reduced data elements, following different numbers of most significant bits or least significant bits being removed.

7. The microprocessor system of claim 1 wherein the processing circuit receives bits from the 'C' function memory at successive times and is configured to store and pack multiple different numbers of bits per data element, such that the 'C' function is called a plurality of times and is provided with a different number of bits from the 'C' function memory on successive times.

8. The microprocessor system of claim 1 wherein the processing circuit is configured to use one or more of the following: vector processors, scalar processors, superscalar processors, and a single uni-core processor executing a single instruction stream, single data stream.

9. A method for a microprocessor system comprising a processing circuit with a hardware extension operably coupled to a memory, the method comprising:
receiving a pack and store instruction;
receiving input data in a form of data elements, each data element having a number of bits;
implementing an extended pointer register for both i) a pack and store operation and ii) a load and unpack operation, the extended pointer register including each of a shiftvalue field for configuring shifting operation, a startbyte field for an initial starting address of a buffer to write, and a packbitsize field that defines a number of bits to store in which the number of bits is any value between zero and a number of bits in the data elements including non-power-of-two values;
configuring, in the packbitsize field, a variable number of bits to store per data element during the pack and store operation, thereby creating reduced data elements representative of the input data, each reduced data element having a reduced number of bits, wherein the hardware extension is configured to implement the pack and store operation in a single pack and store instruction;
running, on the microprocessor system, a 'C' function that employs the input data;
determining a required level of accuracy of the 'C' function;
based on the determined required level of accuracy, allocating to the 'C' function a memory length per data element;
storing in the memory, using the extended pointer register, a concatenation of a plurality of the reduced data elements;
receiving a load and unpack instruction; and
extracting the plurality of the reduced data elements during the load and unpack operation, using the extended pointer register, wherein the hardware extension is configured to implement the load and unpack operation in a single load and unpack instruction.

10. The method of claim 9 further comprising removing bits that are not needed for the determined required level of accuracy from at least some data elements during the pack and store operation.

11. The method of claim 9 further comprising, after the step of configuring a variable number of bits to store per data element during the pack and store operation, performing at least one of: saturation and rounding, on one or more reduced data elements.

12. The method of claim 9 wherein the hardware extension includes a vector register having a plurality of register elements for receiving the input data.

13. The method of claim 9 wherein the hardware extension determines the required level of accuracy by performing code of the 'C' function at run time of the processing circuit.

14. A wireless communication unit comprising:
a radio frequency tuner for receiving an analog signal;
an analog-to-digital converter for converting the analog signal to an N-bit digital data stream;
a memory for storing the N-bit digital data stream in a form of non-reduced data elements; and
a digital signal processor (DSP), operably coupled to the memory via a direct memory access element and configured to convert N-bit data elements to M-bit data elements according to a load and unpack operation and to receive M-bit data elements according to a pack and store operation,
wherein the DSP comprises a hardware extension configured to:
implement an extended pointer register for both i) the pack and store operation and ii) the load and unpack operation, the extended pointer register including each of a shiftvalue field for configuring shifting operation, a startbyte field for an initial starting address of a buffer to write, and a packbitsize field that defines a number of bits to store in which the number of bits is any value between zero and a number of bits in the non-reduced data elements including non-power-of-two values,
determine a required accuracy of the pack and store operation,
configure, in the packbitsize field, a variable number of bits to store per data element during a processor run time,
create a plurality of reduced data elements representative of the non-reduced data elements, each reduced data element having a reduced number of bits relative to the number of bits in each non-reduced data element,
store, using the extended pointer register, a concatenation of the plurality of reduced data elements,
process each reduced data element with a de-interleaver, and
extract, using the extended pointer register, the concatenation of the plurality of reduced data elements during a load and unpack operation.

15. The wireless communication unit of claim 14 wherein the DSP is configured to determine a required accuracy of an application that employs the analog signal and based thereon allocates a total amount of memory for the application or memory length per data element dependent on the determined required accuracy of the application.

16. The wireless communication unit of claim 14 wherein the DSP uses only one instruction to configure, in the packbitsize field, the variable number of bits to store per data element during the pack and store operation.

17. The wireless communication unit of claim 14 wherein the DSP performs at least one of: the pack and store operation using only one instruction, and a load and unpack operation using only one instruction.

18. The wireless communication unit of claim 14 wherein the hardware extension is configured to support multiple modes of pack and store or load and unpack, wherein the multiple modes include different value lengths of the stored reduced data elements, following different numbers of most significant bits or least significant bits being removed.

19. The wireless communication unit of claim 14 wherein the DSP receives bits from the memory at successive times and is configured to store and pack multiple different numbers of bits per data element in supporting a single processing function, such that the single processing function is called a plurality of times and is provided with a different number of bits from the memory on successive times.

20. The wireless communication unit of claim 14 wherein the DSP is configured to use one or more of the following: vector processors, scalar processors, superscalar processors, and a single uni-core processor executing a single instruction stream, single data stream.

\* \* \* \* \*